United States Patent [19]

Strussion et al.

[11] 4,103,436

[45] Aug. 1, 1978

[54] MAP DISPLAY DEVICE

[76] Inventors: Thomas Strussion, 4999 Jefferson St., Belaire, Ohio 43906; Harry D. Moore, Rte. 1, Clarington, Ohio 43915

[21] Appl. No.: 812,857

[22] Filed: Jul. 5, 1977

[51] Int. Cl.² .............................................. G09B 29/00
[52] U.S. Cl. .......................................... 35/40; 428/13
[58] Field of Search ................ 35/40, 41, 42; 428/13; 283/34, 35

[56] References Cited

U.S. PATENT DOCUMENTS

| 1,668,569 | 5/1928 | Murry | 35/42 |
| 2,199,499 | 5/1940 | Kreitler | 35/42 |
| 3,767,203 | 10/1973 | Eaker | 35/42 X |
| 4,031,643 | 6/1977 | Templeton | 428/13 X |

FOREIGN PATENT DOCUMENTS 766,650  4/1934  France ........................................ 428/13

Primary Examiner—William H. Grieb
Attorney, Agent, or Firm—Williamson, Bains, Moore & Hansen

[57] ABSTRACT

A map display device includes a boundary defining structure having a plurality of recessed portions which define geographical areas, such as states, countries or the like. Each recessed portion is adapted to be filled with a material, native to the geographical area, such as soil, and a glass plate covers the boundary defining structure to retain the material within a recessed portion.

5 Claims, 3 Drawing Figures

MAP DISPLAY DEVICE

SUMMARY OF THE INVENTION

This invention relates to a map display device and more particularly to a map display device in which each geographical area constitutes a receptacle for receiving a material, such as soil, wood or the like, therein.

An object of this invention is to provide a map display device including a boundary defining structure shaped in a molding process into a single piece of substantially rigid material having recessed portions therein which define geographical areas for containing therein a material, such as soil, wood or the like, and a glass cover engaging the boundary defining structure for retaining the material in the recessed portions.

Another object of this invention is to provide a map display device, of simple and inexpensive construction in which each geographical area of the map device is recessed for receiving therein a material such as soil, wood or the like from the particular geographical area to thereby provide a map which has significant esthetic appeal.

These and other objects and advantages of this invention will more fully appear from the following description made in connection with the accompanying drawings, wherein like reference characters refer to the same or similar parts throughout the several views.

FIGURES OF THE DRAWINGS

DESCRIPTION OF THE PREFERRED EMBODIMENTS

Figure 1:
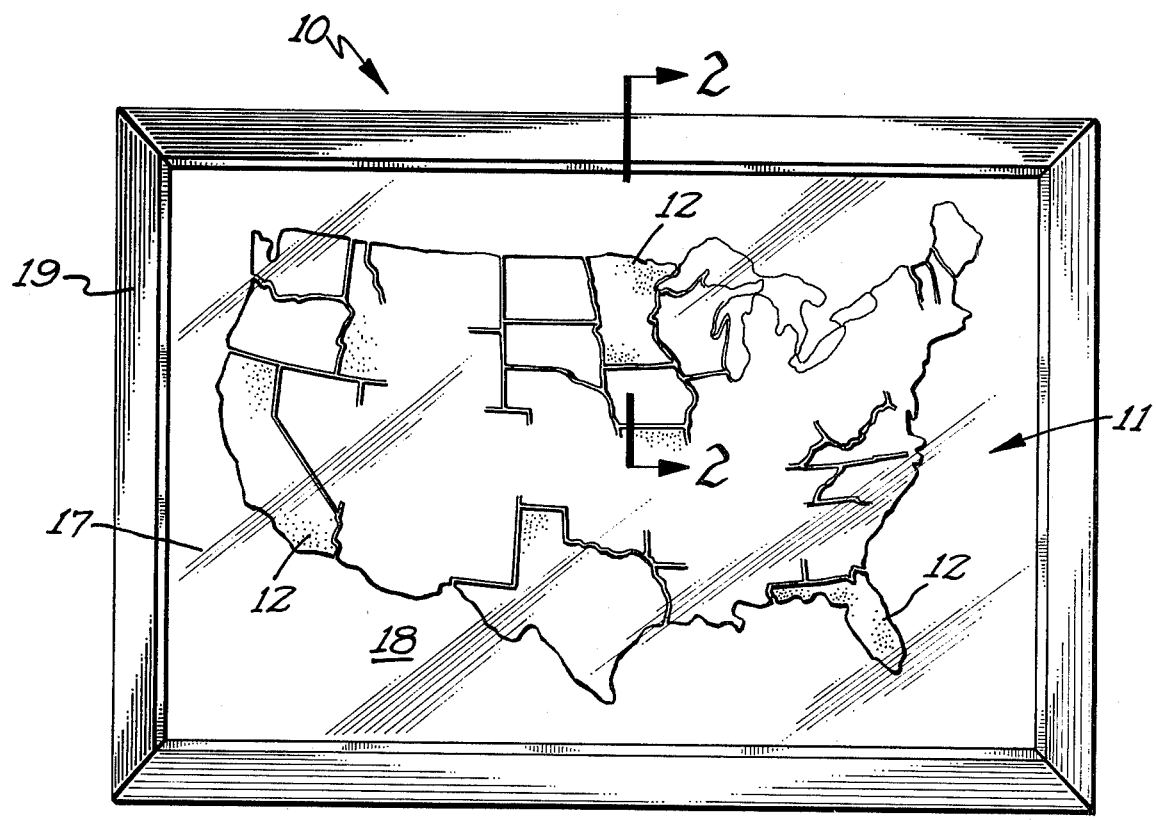
FIG. 1 is a front elevational view of one embodiment of the novel map display device.
Figure 2:
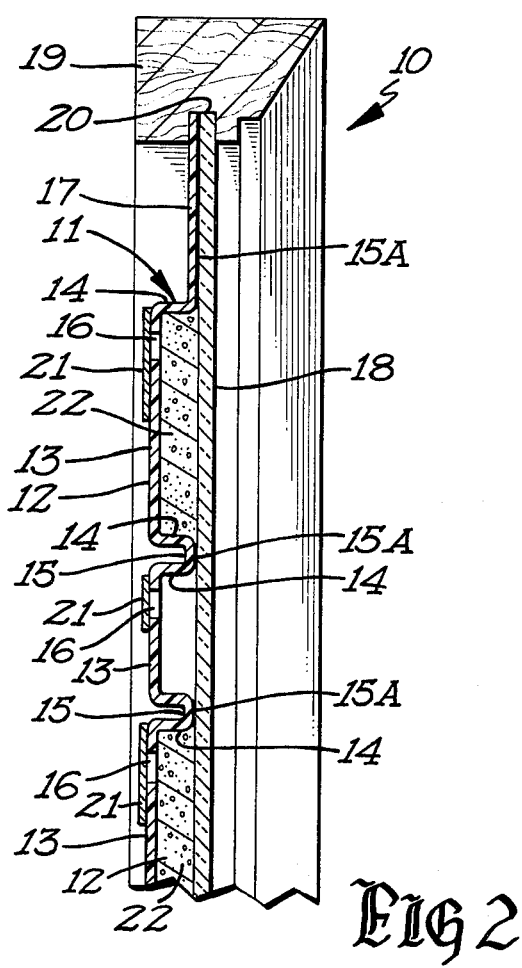
FIG. 2 is a cross-sectional view taken approximately along line 2—2 of FIG. 1 looking in the direction of the arrows.

Referring now to the drawings and more particularly to FIG. 1, it will be seen that one embodiment of the novel map display device, designated generally by the numeral 10, is thereshown. The map display device 10 includes a boundary defining structure 11 which is formed by any conventional shaping or molding process into a single blank of plastic material. Therefore, the boundary defining structure may be formed by vacuum forming, injection molding, press forming or similar process. The boundary defining structure 11 includes a plurality of recessed portions 12, each defining a geographical area. In the embodiment shown, the boundary defining structure is a map of the United States and each of the recessed portions constitutes a separate state.

Each recessed portion 12 includes a bottom wall 13 which is of substantially flat configuration and a continuous peripheral wall 14 integral with and projecting outwardly or upwardly from the bottom wall 13. The peripheral walls of adjacent recessed portions are rigidly interconnected by boundary defining portions 15 which are of substantially flat configuration, but which may be geometrically irregular. In the preferred embodiment, the upper surface of the boundary defining portions 15 are disposed in a single plane and, it is also preferred that the respective bottom walls of the recessed portions also be disposed in a single plane. However, it is pointed out that the boundary defining structure may also be shaped into a sphere. In this event, the bottom wall 13 and the boundary defining portions could be of arcuate configuration rather than flat.

Figure 3:
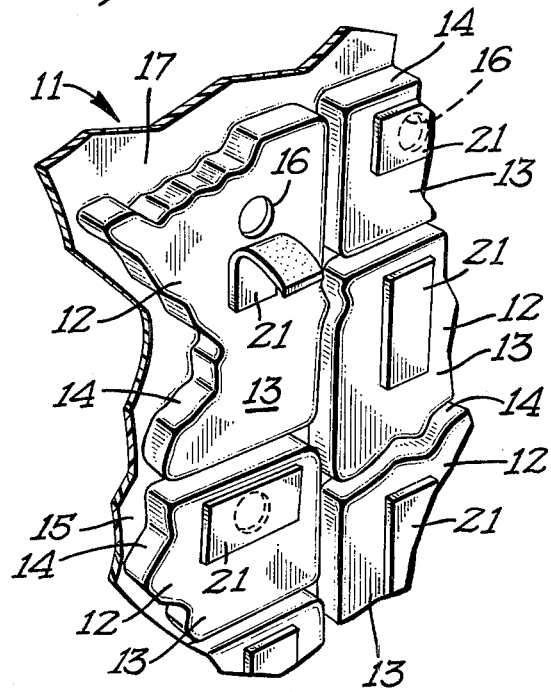
FIG. 3 is an enlarged fragmentary perspective view of a portion of the map display device illustrating details of construction thereof.

Referring now to FIG. 3, it will be seen that the bottom wall 13 of each recessed portion 12 is provided with an opening 16 therein, the function of which will be described more fully herein below. The boundary defining portion 11 also includes marginal portions 17 which may completely surround the depicted geographical areas. In the embodiment shown, the marginal portions 17 are disposed in the same plane as the boundary defining portions 15.

The map display device 10 also includes a transparent, rigid cover plate 18 which may be formed of plastic, glass or the like. The cover plate 18 is positioned against the boundary defining structure 11 so that one surface of the cover plate engages the boundary defining portions 15 and the marginal portions thereof. The peripheral edge portions of the boundary defining structure and the cover plate 18 are positioned within recesses 20 of a display frame 19. It will be noted that the display frame 19 is of generally rectangular shaped configuration and is similar to the conventional picture frames. The frame 19 may be formed of wood, plastic or the like, and it will be noted that the frame retains the boundary defining structure and cover plate in clamped relation with respect to each other. Alternatively, a map display device may be incorporated in a table top, tray or the like rather than a picture frame.

When the cover plate 18 is applied to the boundary defining structure, the cover plate will very tightly engage the boundary defining portions 15 of the boundary defining structure to form a seal thereat. In order to improve the sealed effect between the boundary defining portions 15 and the cover plate 18, a suitable cement, such as glue 15a, may be used. Each of the recessed portions 12 is adapted to be filled with a native geographical material, such as soil, wood or the like. It is preferred that the particulate soil be the native soil of the particular geographical area in which the soil is placed. The material 21 is introduced into the recessed portions through the associated openings 16 in the bottom wall 13 thereof. A closure element 22, such as an adhesive coated strip 21, closes the opening 16 and cooperates with the cover plate for retaining the flowable material within each recessed portion. In the event that the material is wood, each piece of wood will have been cut to the shape of its associated state and will be pressed into its associated recess.

In the embodiment shown, the material for each state will be the native soil of each state. In this respect, it is preferred that the boundary defining structure 11 be pigmented (or a non-pigmented white color) to form a contrast with the native soil of each state. The map display device may be marketed to a consumer with instructions for the consumer to select the soil samples from each state during the course of travel. Alternatively, the map display device may be marketed with the soil samples contained within each of the recessed portions, or the soil may be sold in separate containers for each recess to be placed in the negative recesses by the user. Naturally, if a user does not visit a particular geographical area, he may purchase the missing soil sample.

As an alternative to soil samples, wood particles from native trees, grain, or other suitable flowable material native to the particular geographical area may be used.

Although the map display device illustrated shows the map of the United States, it is pointed out that the map display device could also be used to illustrate any country, state, sub-division, such as counties, cities, or sub-divisions thereof. It is also pointed out that the map display device has special utility in permitting the user to record or chronicle the geographical areas which are visited. Further, the map display device can be used in the educational field for illustrating the soil or products native to a particular geographical area.

From the foregoing description, it will be seen that I have provided a novel map display device, which is not only a simple and inexpensive construction, but one which has great esthetic appeal.

What is claimed is:

1. A map display device comprising a substantially rigid boundary defining structure formed from a single piece of rigid, moldable material,
    said boundary defining structure having a plurality of recessed portions each being shaped to define a geographical area, each recessed portion including a lower wall and a continuous peripheral wall integral with said lower wall and projecting therefrom,
    said boundary defining structure including a plurality of boundary defining surfaces integral with and interconnecting peripheral wall portions of adjacent recessed portions,
    the lower wall of each recessed portion having an opening therein,
    means for closing each of said openings,
    a flowable material filling each recessed portion,
    and a transparent, flat recessed cover corresponding in size and shape to said boundary defining structure engaging in sealing relation the boundary defining portions of the boundary defining structure and retaining the flowable material therein.

2. The map display device as defined in claim 1 wherein all the boundary defining portions are disposed in a single plane.

3. The map display device as defined in claim 2 wherein said flowable material comprises soil.

4. The map display device defined in claim 2 wherein the lower wall of each of said recessed portions is disposed in a single plane.

5. A map display device comprising:
    a substantially rigid, single piece boundary defining structure formed of rigid material,
    the boundary defining structure having a plurality of recessed portions therein each being shaped to define a geographical area, each recessed portion including a lower wall and a continuous peripheral wall integral with said lower wall and projecting therefrom, said recessed portions being adapted to contain a material therein,
    said boundary defining structure including a plurality of boundary defining portions integral with and interconnecting peripheral wall portions of adjacent recessed portions, said boundary defining portions being disposed in a single plane,
    and a transparent, flat rigid cover corresponding in size and shape to said boundary defining structure and engaging the boundary defining portions of the latter.

* * * * *